United States Patent Office 3,211,675
Patented Oct. 12, 1965

3,211,675
CELLULAR CONCRETE AND ITS PREPARATION
Robert L. Johnson, Madison, Wis., assignor to Ethyl Corporation, New York, N.Y., a corporation of Virginia
No Drawing. Filed Jan. 3, 1962, Ser. No. 164,158
26 Claims. (Cl. 260—2.5)

The present invention relates to new and improved compositions useful in the preparation of cellular concrete, processes of using these compositions and to the products produced thereby. This application is a continuation-in-part of my copending application Serial No. 811,552, filed May 7, 1959, now abandoned.

Heretofore, various procedures have been employed in the preparation of cellular concrete. These include chemical processes and foaming methods to produce the cellular form. The prior art foaming methods can be divided into what is termed "mixed-foaming," wherein a foaming agent is added to the concrete mixture after all other ingredients have been mixed to a slurry, and pre-foaming where the foam is injected from a foam generator directly into the concrete mixture. Illustrative of the chemical processes employed heretofore is the method of Aylsworth and Dyer (U.S. 1,087,098, dated February 14, 1914). In this method, the cellular structure is produced by expansion caused by the generation of a gas within the concrete mixture prior to setting.

Cellular concretes can also be divided into two major groups according to the method of curing. One group comprises materials which are subjected to moist curing, and the other includes materials which are cured in an autoclave at high temperatures and pressures. The physical properties of the materials produced by both curing methods are, in general, similar. However, neither method is suitable for the preparation of low-density cellular concrete which possesses strength sufficient for structural utilization.

Nevertheless, cellular concrete products having low densities have been produced commercially by the moist-cured method. These materials cannot be used for structural application because of low strength and are, in most cases, employed as insulation. The autoclaved cellular concrete products, which generally possess greater strength than the moist-cured, are handicapped in that the autoclaving step makes them less economically attractive than non-autoclaved materials. This additional expense flows from the high capital investment for pressure equipment coupled with the necessity for precasting the material to be autoclaved. Another deficiency of the autoclaved materials is their high moisture absorption. A further problem generally incurred in the preparation of cellular concrete involves the length of curing cycles required, these being much longer than needed for light-weight aggregate concrete building block materials.

It is an object of this invention to provide a structural cellular concrete, and mixes therefor, having low density and high strength which does not require autoclaving in order to attain these properties. It is a further object of this invention to provide a cellular concrete material which has a curing cycle comparable to the curing cycles of conventional concrete materials. A still further object of this invention is the provision of cellular concrete material having good acoustical properties, low thermal conductivity, low thermal expansion, resistance to freezing and thawing, fire resistance, and high compressive strength.

Another object is to provide a novel process for the preparation of the above described materials. By this process, these materials can be produced in a single cast operation with the elimination of the problems present in prior art processes for producing cellular concrete—especially those processes requiring precasting. These and other objects shall become more apparent hereinafter.

It has been discovered that cellular concrete materials free from the above mentioned deficiencies of the prior art can be produced simply and economically by incorporating a resin into a composition suitable for producing cellular concrete. (By "composition suitable for producing cellular concrete" is meant any mixture useful in preparing cellular concrete—as defined more fully hereafter.) Therefore, within the scope of this invention is a composition, suitable for producing cellular concrete, comprising a resin and hydraulic cement. Another embodiment is a composition, suitable for producing cellular concrete when mixed with water and an expanding agent, comprising a resin, hydraulic cement and an α-metallo-metallic salt of an organic acid. This invention also provides a composition suitable for producing cellular concrete, when mixed with water and an expanding agent, comprising hydraulic cement and an α-metallo-metallic salt of an oragnic acid. Another embodiment encompasses a composition comprising hydraulic cement, an α-metallo-metallic salt of an organic acid and an expanding agent. (By "expanding agent" is meant a substance capable of evolving gas when mixed in a concrete mixture.)

The resin component and the α-metallo-metallic salt of an organic acid can be combined singly or in combination with any composition suitable for the preparation of cellular concrete. These mixtures are thoroughly described by R. C. Valore, Jr., in The Journal of the American Concrete Institute, June 1954, pages 773 to 796. Generally, it is preferred to employ cellular concrete mixes which contain sodium hydroxide as one of the foaming ingredients. Cellular concrete mixtures of this type are further described in U.S. 1,087,098 and 1,954,117. In general, any alkali or alkaline earth metal hydroxide of a metal occupying a position in the electromotive series above the metallic constituent of said expanding agent can be employed in the instant invention.

An especially preferred embodiment of this invention provides a composition suitable for producing cellular concrete when mixed with water comprising hydraulic cement, an α-metallo-metallic salt of an organic acid, an epoxy resin and a curing agent—the latter being more fully defined hereinafter.

A further embodiment of this invention provides an essentially dry composition comprising hydraulic cement and an epoxy resin or a polyurethane resin.

Another embodiment of this invention is an essentially dry composition comprising hydraulic cement, a resin which can be either a polyurethane resin or an epoxy resin, and an α-metallo-metallic salt of a carboxylic acid.

A still further embodiment of the present invention is a dry composition of hydraulic cement, a resin which can be either a polyurethane resin or an epoxy resin, and an alkali or alkaline earth metal hydroxide.

Another embodiment of this present invention is an essentially dry composition consisting of hydraulic cement, a resin which can be either a polyurethane or an epoxy resin, an alkali or alkaline earth metal hydroxide, and an expanding agent.

A still further embodiment of the present invention is an essentially dry composition comprising hydraulic cement, a resin which can be either a polyurethane resin, or an epoxy resin, an α-metallo-metallic salt of a carboxylic acid, and an expanding agent.

In general, the processes of this invention comprise improving the foam properties of cellular cement mixes through the incorporation therein of a resin. In another embodiment, the foam properties of cellular cement mixes are improved through incorporation therein of a resin and an α-metallo-metallic salt of an organic acid. A still further embodiment comprises the incorporation into a cellular cement mix an α-metallo-metallic salt of an organic acid.

When the process of this invention comprises improving the foam properties of cellular cement mixes through the addition thereto of an α-metallo-metallic salt of an organic acid, the hydraulic cement and α-metallo-metallic salt of an organic acid can be pre-mixed. Such pre-mixing can be effected at the cement bagging site or on the job site. Thereafter, the water and expanding agent can be added to this premix and the resulting slurry blended, employing conventional blending techniques. Since there is a time lapse before the expanding process commences, sufficient time is presented for casting or molding the resultant slurry.

Another process comprises pre-mixing the α-metallo-metallic salt of an organic acid, the expanding agent and the hydraulic cement, and thereafter adding water. This slurry is then blended and cast or molded. Still other methods of incorporating the α-metallo-metallic salt of an organic acid can easily be envisioned in view of the above teaching.

A preferred process for improving the foaming properties of cellular cement mixes comprises blending the hydraulic cement, the expanding agent and water, and thereafter blending therein a hot (25–80° C.) mix comprising an α-metallo-metallic salt of an organic acid, a resin and standard curing agent for the resin. The mixture is cast and allowed to foam.

Cellular concrete products further constitute novel compositions of matter within the scope of this invention. These compounds are produced by the incorporation of a compound selected from the group consisting of polyurethane resins, epoxy resins and α-metallo-metallic salts of carboxylic acids into a mixture comprising water, expanding agent and hydraulic cement. The cellular concrete products of this invention are moist-cured cellular concrete having a bulk density (in water) ranging from about 30 pounds per cubic foot to about 80 pounds per cubic foot, and having a compressive strength of about 200 pounds per square inch to about 3,000 pounds per square inch. Generally, the cellular concrete products produced in this invention have bulk densities ranging from about 40 to about 70 pounds per cubic foot and a compressive strength ranging from about 1,000 to about 2,500 pounds per square inch.

The following non-limiting working examples are more fully illustrative of this invention. In these examples, all parts and percentages are by weight unless otherwise specified.

When, in the following examples, an epoxy resin is employed, it is the product produced by the reaction between epichlorohydrin and bis-phenol-A in the presence of aqueous caustic. The resin is liquid at room temperature and has a molecular weight varying between about 300 and 530. The melamine formaldehyde resin employed is a butylated melamine formaldehyde.

Example I 1,000 parts of Portland cement (Type 1), 324 parts water containing 6.3 parts calcium chloride and 12.5 parts of acrylamide were mixed well for 3 minutes and allowed to stand for 1¼ hours. In a separate container there were mixed 68.5 parts of epoxy resin, 3.1 parts of melamine-formaldehyde resin, 9.4 parts of α-sodio-sodium acetate, 25 parts of ethylene sulfide polymer with a molecular weight of approximately 1,000 4.7 parts of dimethylaminomethylphenol, and 4.7 parts of 2,4,6-tris-(dimethylaminomethyl)phenol, and 6 parts of aluminum powder. The latter mixture was blended into a cement mixer and after mixing well, the slurry was poured into an open mold. When cured and dried, this mixture had a bulk density of 83 pounds per cubic foot and a compressive strength of 2,188 pounds per square inch.

Example II 1,000 parts of Portland cement (Type 1), 75 parts of fly ash, 6.3 parts of Cab-O-Sil (a silica aerogel), 450 parts of water containing 6.3 parts of calcium chloride and 12.5 parts of acrylamide were mixed 3 minutes and allowed to stand for 1 hour and 5 minutes. In a separate container were mixed 75 parts of epoxy resin, 3.1 parts of melamine-formaldehyde resin, 9.3 parts of α-sodio-sodium acetate, 25 parts of ethylene sulfide polymer with the molecular weight of 1,000, 4.7 parts of the dimethylaminomethylphenol, 4.7 parts of the 2,4,6-tris-(dimethylaminomethyl)phenol, 4.7 parts of aluminum powder and 3.1 parts of Cab-O-Sil. The latter mixture was blended into the cement mixture and after mixing well poured into an open mold. After cooling and drying this mixture had a bulk density of 64.5 pounds per cubic foot and a compressive strength of 1,688 pounds per square inch.

Example III

Into a cement mixer were placed 1,000 parts of Portland cement (Type 1), 324 parts of water containing 6.3 parts of calcium chloride and 12.5 parts of acryamide. After mixing well, the mixture was allowed to set for 1½ hours. At this time there were added 9.3 parts of α-sodio-sodium acetate and 6 parts of aluminum powder and after thorough mixing, the mixture was poured into an open mold. Upon cooling and drying the product had a bulk density of 64.5 pounds per cubic foot and a compressive strength of 875 pounds per square inch.

Example IV 1,000 parts Portland cement (Type 1), 324 parts water containing 6.3 parts calcium chloride and 12.5 parts of acrylamide were mixed well in a cement mixer for 3 minutes and allowed to stand about 1 hour. In a separate container there were mixed 25 parts of 2,4-tolylene diisocyanate, 25 parts of polyethylene glycol (having a molecular weight of approximately 200), 10 parts of adipic acid, 6 parts of aluminum powder and 9.3 parts α-sodio-sodium acetate. The latter mixture was immediately blended into the cement mixer and after mixing well, the slurry was poured into an open mold. When cooled and dried this mixture had a light bulk density and good compressive strength, sufficient for structural utilization.

Example V

The process of Example I is employed with the exception that in place of 1,000 parts of Portland cement there is employed 1,000 parts of high calcium quick lime. In this manner a good cellular concrete product is produced having a low bulk density and a high compressive strength.

Example VI

A mixer was charged with 1,000 parts Portland cement (Type 1) and 324 parts water containing 6.3 parts calcium chloride, 12.5 parts acrylamide and 5.0 parts sodium hydroxide. After thorough mixing, the cement was allowed to set for about 1 hour. In a separate vessel there were mixed 58.5 parts epoxy resin, 3.1 parts melamine-formaldehyde resin, 25 parts ethylene disulfide polymer, 4.7 parts dimethylaminomethylphenol, 4.7 parts 2,4,6-tris-(dimethylaminomethyl)phenol, and 4 parts aluminum powder. The resin mixture was mixed well with the cement mixture and the resulting concrete poured into a mold and allowed to cure. The cured concrete had a bulk density of 77 pounds per cubic foot and a compressive strength of 2,000 p.s.i.

Example VII

A mixer was charged with 1,000 parts cement (Type 1), 75 parts fly ash, 6.3 parts Cab-O-Sil and 450 parts water containing 6.3 parts calcium chloride, 12.5 parts acrylamide and 5 parts sodium hydroxide. The above was mixed well and allowed to set for about 1 hour before adding the mixture described below. In a separate vessel there were mixed 75 parts epoxy resin, 3.1 parts melamineformaldehyde resin, 25 parts ethylene disulfide polymer, 4.7 g. dimethylaminomethylphenol, 4.7 parts 2,4,6-tris-(dimethylaminomethyl)phenol, 4.7 parts aluminum powder, and 3.1 parts Cab-O-Sil. The two mixtures were blended well before pouring into a mold for curing. The cured concrete had a bulk density of 67 pounds per cubic foot, and a compressive strength of 1,375 p.s.i.

The following examples demonstrate the essentially dry mechanical mixtures of ingredients which form further embodiments of the present invention. After mixing, these compositions may be appropriately packaged, stored and/or shipped for subsequent use in producing the concretes of this invention.

*Example VIII*

1,000 parts of Portland cement (Type 1) and 68.5 parts of epoxy resin are mixed in an essentially anhydrous state until the ingredients form an essentially homogeneous mixture.

This dry mixture may then be sacked and transported to another location for mixing with other ingredients to produce foamed concrete. For example, the foregoing Portland cement and epoxy resin composition may be mixed with 6.3 parts of calcium chloride, 12.5 parts of acrylamide, while mixing and thereafter adding 3.1 parts of melamine formaldehyde, 25 parts of ethylene sulfide polymer with a molecular weight of approximately 1,000, 4.7 parts of dimethylaminomethylphenol, 4.7 parts of 2,4,6,-tris-(dimethylaminomethyl)phenol, 9.4 parts of α-sodio-sodium acetate, 324 parts of water, and 6 parts of aluminum powder, the mixture being blended in a cement mixer and after mixing well, being poured into an open mold.

*Example IX*

1,000 parts of hydraulic cement, 70 parts of epoxy resin, and 10 parts of α-sodio-sodium acetate are blended into a substantially homogeneous mixture in an essentially anhydrous state. This homogeneous mixture is then packaged after which it can be transported from one location to another.

The homogeneous mixture comprising cement, epoxy resin and α-sodio-sodium acetate may then be blended with other ingredients to produce foamed concrete. For example, to the dry mixture are added 6.3 parts of calcium chloride, 12.5 parts of acrylamide, 3.1 parts of melamine formaldehyde resin, 25 parts of ethylene sulfide polymer with a molecular weight of approximately 1,000, 4.7 parts of dimethylaminomethylphenol, 4.7 parts of 2,4,6-tris-(dimethylaminomethyl)phenol, 6 parts of aluminum powder, and 324 parts of water; the mixture is blended well in a cement mixer after which the slurry is poured into a mold to produce the foamed concrete product.

*Example X*

An essentially dry homogeneous mixture of 1,000 parts of hydraulic cement, 60 parts of expoxy resin and 5 parts of sodium hydroxide is produced by blending the dry ingredients together.

This dry composition may then be mixed with other ingredients to product foamed concrete. For example, the dry composition as described above is mixed with 6.3 parts of calcium chloride, 12.5 parts of acrylamide, 3.1 parts af melamine formaldehyde, 25 parts of ethylene disulfide polymer, 4.7 parts of dimethylaminomethylphenol, 4.7 parts of 2,4,6-tris-(dimethylaminomethyl)phenol, 4 parts of aluminum powder, and 32 parts of water, the mixture being blended in a cement mixer and the resultant slurry of concrete poured into a mold and allowed to set.

*Example XI*

Hydraulic cement (1,000 parts) is blended with 70 parts of epoxy resin, 5 parts of sodium hydroxide and 4 parts of powdered aluminum, said mixing and blending being conducted in an essentially anhydrous atmosphere.

This dry mixture may then be mixed with other ingredients to produce a foamed concrete product. For example, the composition as described above is mixed with 6.3 parts of calcium chloride, 12.5 parts of acrylamide, 3.1 parts of melamine formaldehyde, 25 parts of ethylene disulfiide polymer, 4.7 parts of dimethylaminomethylphenol, 4.7 parts of 2,4,6-tris-(dimethylaminomethyl)phenol, and 32 parts of water, the mixture being blended in a cement mixer and the resultant slurry of concrete poured into a mold and allowed to cool.

*Example XII*

An essentially anhydrous composition is produced by blending into a homogeneous mass hydraulic cement (1,000 parts), 70 parts of epoxy resin, 10 parts of α-sodio-sodium acetate, and 6 parts of aluminum powder. The dry composition thereby produced may be packaged and transported from one area to another for further mixing to produce a foamed concrete produce. For example, the composition as described above is mixed with 6.3 parts of calcium chloride, 12.5 parts of acrylamide, 3.1 parts of melamine formaldehyde resin, 25 parts of ethylene sulfide polymer having a molecular weight of approximately 1,000, 4.7 parts of dimethylaminodimethylphenol, 4.7 parts of 2,4,6-tris-(dimethylaminomethyl)phenol, and 324 parts of water, the mixture is blended into a concrete mixer and after mixing well, the slurry is poured into an open mold to produce the foamed concrete product.

It will be clear from the foregoing examples that all of the ingredients of the various compositions of this invention can be compounded into various dry mixtures as long as water and the curing agent are not used in the formulation of these dry mixtures. Thus, one may compound cement, resin, an α-metallo-metallic salt of a carboxylic acid and/or an alkali or alkaline earth metal hydroxide to produce various sub-combinations which can be used in association with water and an appropriate curing agent to form the foamed concretes of this invention.

As noted in Examples VIII through XII, all of the ingredients making up these dry mixtures should be compounded in an essentially anhydrous environment. The resultant blends of dry ingredients may then be stored and/or transported from one geographical location to another while being maintained in an essentially dry state. For example, all of the elements may be packaged in a suitable paper, cardboard, plastic (e.g., polyethylene) or metal container which would exclude water. In some instances, it is of value to use a desiccant in the packaging operations to insure the presence of an essentially anhydrous environment even during prolonged storage.

Other epoxy resins can be employed equally as well in addition to the aforementioned reaction product between bis-phenol-A and epichlorohydrin. Thus, 50 parts epoxy resin produced by the reaction between epichlorohydrin and ethylene glycol can be employed in place of the 68.5 parts epoxy resin utilized in Example I. The reaction product produced when epichlorohydrin is reacted with resorcinol is illustrative of another epoxy resin which can be employed with equal results in the above working examples. Thus, in Example II, in place of 75 parts of the epoxy resin-produced when epicholrohydrin is reacted with Bis-phenol-A, 70 parts of epoxy resin produced when resorcinol and epichlorohydrin are reacted can be employed. The cellular concrete product when these other epoxy resins are employed has low density and high strength which are characteristic of the cellular concrete products of this invention. In similar fashion any other prior art epoxy resin produced by the reaction of a polyhydroxide with epichlorohydrin can be employed in the above working examples.

Similar, polyurethane resins can be employed in place of the epoxy resins of the above working examples. Thus, in Example I a polyurethane having a specific gravity of 0.30 produced by the reaction of a polyester (said polyester being the condensation product of adipic acid and ethylene glycol) with ethylene diisocyanate and having a specific gravity of about 0.30 can be employed. Further, in Example IV in place of 25 parts of 2,4-tolylene diisocyanate and 25 parts of polyethylene glycol having a molecular weight of approximately 200 there can be employed 30 parts of ethylidene diisocyanate and 30 parts of decamethylene glycol. In Example II, in place of the epoxy resin employed therein, there can be utilized 80 parts of a polyurethane produced by the reaction of propylene glycol and hexylene-1,6-diisocyanate. Any other polyurethane resin known to the prior art can be employed in the above working examples with equal facility to produce a low-density, high-strength, cellular concrete product.

The resins employed herein are selected from the group consisting of polyurethane and epoxy resins. By epoxy resins is meant an epoxy resin produced by the reaction of epichlorohydrin and a polyhydroxy hydrocarbon. These compounds are usually made by the condensation of epichlorohydrin with bis-phenol-A, ethylene glycol, glycerol, and related hydroxyl containing compound such as hydroxy cycloaliphatics; bis-phenol-A $(HOC_6H_4C(CH_3)_2C_6H_4OH)$ is generally employed. Other dihydric phenols such as resorcinol and hydroquinone may also be used. Another type of resin employs a polyhydric alcohol like glycerol in place of the dihydric phenol.

The polyhydroxy hydrocarbons which can be employed in a reaction with epichlorohydrin to make the epoxy resins utilized in this invention are more fully illustrated by the following general formula:

$$R(OH)_x$$

wherein R equals a hydrocarbon radical containing between about 2 to 30 carbon atoms, preferably a hydrocarbon derived from an arene molecule containing between about 6 through 15 carbon atoms. R can also be a hydrocarbon derived from an alkane containing between about 2 through 6 carbon atoms. $x$ is an integer greater than 1 representing the number of hydroxy groups substituted on the hydrocarbon R. Further illustrative of the specific polyhydroxy compounds which can be employed herein are ethylene glycol, propylene glycol, butylene glycol-2,3, butylene glycol-1,3, 2-methylpentane diol-2,4,2-ethyl hexane diol-1,3-hexamethylene glycol, styrene glycol, and decamethylene glycol and the like; diethylene glycol, triethylene glycol, tetraethylene glycol, polyethylene glycols 200, 400, and 600, etc., dipropylene glycol, tripropylene glycol, polypropylene glycols 400, 750, 1200 and 2000 and the like.

In general, any of the prior art epoxy resins similar to those described above can be employed in the instant invention. These prior art epoxy compounds are more fully defined in "High Polymers," volume 10, Schildknecht; generally, in chapter 10 and specifically at pages 430 to 439.

The polyurethanes employed herein are the reaction products of a polyisocyanate and a polyhydroxy hydrocarbon or a polyester containing a labile hydrogen atom. The polyhydroxy hydrocarbon can be any alkylene glycol, polyoxy alkylene glycol or arene glycol such as those described hereinbefore in the discussion of epoxy resins.

The polyesters used can include those obtained by condensing any poly basic (preferably dibasic carboxylic) organic acid such as adipic, sebacic, phthalic, isophthalic, terphthalic, oxalic, malonic succinic, maleic, cyclohexane-1,2-dicarboxylic, cyclohexane-1,4-dicarboxylic naphthalene-1,2-dicarboxylic, fumaric itaconic, etc., with poly alcohols such as ethylene glycol, diethylene glycol, penta glycol, glycerol, sorbitol, and the like.

The organic polyisocyanates useful in the practice of the invention include ethylene diisocyanate, ethylidene diisocyanate, proplene-1,2-diisocyanate, butylene-1,3-diisocyanate, hexylene-1, 6-diisocyanate, cyclohexylene-1,2-diisocyanate, m-phenylene diisocyanate, 2,4-tolylene diisocyanate, 1,6-tolylene diisocyanate, 3,3'-dimethyl-4,4'-biphenylene diisocyanate, 3-3'-dimethoxy-4'-4-biphenylene diisocyanate, 3,3-diphenyl-4,4'-biphenylene diisocyanate, 3,3'-dichloro-4,4'-biphenylene diisocyanate, triphenyl methane triisocyanate, 1,5-naphthalene diisocyanate or polyisocyanates in a blocked or inactive form such as bisphenyl carbamates of tolylene diisocyanate, p,p'-diphenyl methane diisocyanate, p-phenylene diisocyanate and 1,5-naphthalene diisocyanate, and the like.

The organo polyisocyanates can be more fully represented by the following general formula $$R(NCO)_x$$

wherein R is a hydrocarbon containing between about 2 through 30 carbon atoms, preferably a hydrocarbon derived from an arene molecule containing between about 6 through 19 carbon atoms; and $x$ is an integer greater than 1 representing the number of isocyanate groups substituted on the hydrocarbon R.

Generally, any of the prior art polyurethane resins may be employed in the process of this invention. Those polyurethanes applicable are more thoroughly described in Schildknecht, "High Polymers," vol. 10, at pages 515 through 517.

The $\alpha$-metallo-metallic salt of organic acids employed in this invention can be depicted by the formula $$\left( M_x - \underset{R'}{\underset{|}{\overset{R}{\overset{|}{C}}}} - C \underset{O}{\overset{O}{\diagdown}} \right)_y M'_z$$

wherein R and R' can be the same or different and are selected from the group consisting of hydrogen and organic radicals. M and M' are monovalent or polyvalent metallic ions which can be the same or different and $x$, $y$ and $z$ can be the same or different and are small whole numbers.

Those $\alpha$-metallo-metallic salts which are especially preferred in the processes of this invention are the alkali and alkaline earth metal salts of an $\alpha$-metallo-metallic acetate. These compositions are produced according to the methods described in U.S. 2,850,528.

The following list of compounds more fully describe the $\alpha$-metallo-metallic salts used in this invention; $\alpha$-sodio-sodium propionate, $\alpha$-sodio-potassium-4-methyl caproate, $\alpha$-potassio-sodium vinyl acetate, $\alpha$-sodio-sodium-2-cyclohevyl acetate, $\alpha$-lithio-lithinum isobutyrate, $\alpha$-sodio-calcium acetate and $\alpha$-potassio-aluminum acetate. These compounds can be employed in the foregoing working examples in place of the $\alpha$-sodio-sodium acetate compounds employed therein to produce cellular concrete products having excellent structure characteristics and light weight properties.

By the term "hydraulic cement" as used in the discussion is meant any of various classes of hydraulic cements now being employed or having been employed in concrete or masonry construction. Therefore these materials may be Portland cement, lime, or a blend of both. When Portland cements are employed, generally it is preferred to utilize that class of Portland cement defined as "normal" Portland cement (such as ASTM Type 1, Portland cement) although it is possible to employe high early-strength Portland cement (ASTM Type III) to reduce curing and for-use time.

The term "expanding agent" as used in this invention can be described as any substance capable of evolving a gas when admixed in a concrete mixture. As already noted, it is preferred to employ as an expanding agent, metallic aluminum, barium, calcium, zinc, magnesium or lithium, in powdered or other form; alloys of these metals in any desired combination or percentage when used in either powdered or other form; amalgams of these materials or their alloys in powdered or other form; calcium caproate or barium carbide and the like.

Those curing agents which can be employed in the instant invention are any standard resin curing agent such as those described by Schildknecht, "High Polymer Processes," vol. 10, chapter 10, particularly pages 439–454. Examples of these curing agents are: organic amines such as ethylene diamine, diethylene triamine, dimethylaminopropylamine, 2,4-diamino-2-methylpentane, dimethylaminomethylphenol, 2,4,6 - tris-(dimethylaminomethylphenol), morpholine and benzyl dimethylamine (pages 439–545); acid anhydrides such as phthalic, succinic, and maleic anhydrides along with other acids such as n-butyl dihydrogen phosphate and phosphoric acid; polysulfide liquid polymers of the Thiokol type. Aldehyde condensation resins such as urea-formaldehyde, melamine formaldehyde and phenolformaldehyde act as curing agents. Amides such as acrylamide, urea, thiourea, toluenesulfanamide, t-butyl acrylamide are also used. Boron trifluoride complexes with amines such as dimethylamine, ethylamine and piperidine cure epoxies rapidly at high temperatures. These curing agents can be used alone or formulated into a standard curing recipe.

In the process of this invention it is also feasible to employ various aggregate materials so as to adapt the masses prepared according to this invention for use within wide limits dependent on the properties desired.

The term "aggregate materials" includes the various classes of sand, cinders, slag, stone, burned clap and shell aggregate. By this term it is also intended to include pozzolanic materials which are generally defined as a finely divided material rich in silica or alumina, which while not necessarily cementitious reacts at ordinary temperatures with hydrated lime in the presence of water to form insoluble cementitious products. Also included in this term are those coarse light weight aggregates contained in a foamed matrix of lime and silica. In many cases these "siliceous" cements give excellent results.

The proportions of the $\alpha$-metallo-metallic salts which are employed in this invention (based on the amount of expanding agent used) range from a weight ratio of about 1:1 to about 5:1 of metal salt to expanding agent employed. It is preferred to employ a ratio of about 1.5:1 to 2:1 metal salt to expanding agent.

In most cases the weight ratio of total parts cement, water, and aggregate to total parts of all the other materials in the recipes of this invention vary from about 10:1 to about 40:1 although ratios of about 1:1 to about 50:1 can be employed. Weight ratios of about 10:1 to 20:1 have yielded the most satisfactory and economical materials.

The properties of the cellular concrete shapes produced by the processes of this invention are such that they have a wide field of use. Typical examples of the more common applications, combining the structural characteristics and insulating properties of these materials, are block shapes used per se or plastered for load-bearing walls and for panel walls in frame buildings and are particularly useful for roofs where high insulation is desired. Low density and fire resistance of the products produced herein make these materials particularly adaptable for the construction of fire-resistant walls in old as well as new structures. Because of the light weight properties and the high strength of these materials they find utility as a decking material which can be cast at the job site. The light weight characteristics save in materials and labor and greatly improve insulation. The curing cycles avoid long delays before the resumption of construction on the particular area cast.

In short these products find utilization as a versatile material for employment in applications where a high strength, economical, light weight, rigid, durable, fire-resistant material with low thermal conductivity is required.

What is claimed is:

1. A composition suitable for producing cellular concrete comprising (1) hydraulic cement, (2) a resin selected from the group consisting of (A) a polyurethane resin derived from a polyisocyanate and an organic compound having at least one labile hydrogen atom and (B) an epoxy resin derived from epichlorohydrin and a polyhydroxy hydrocarbon, and (3) an $\alpha$-metallo metallic salt of a carboxylic acid; said cement and said resin being employed in a weight ratio of cement to resin of about 1:1 to about 50:1, the metallo and metallic elements of said salt being selected from the group consisting of alkali and alkaline earth metals.

2. The composition of claim 1 wherein said resin is an epoxy resin and said $\alpha$-metallo metalic salt is $\alpha$-sodio-sodium acetate.

3. A composition suitable for producing cellular concrete comprising (1) hydraulic cement, (2) a resin selected from the group consisting of (A) a polyurethane resin derived from a polyisocyanate and an organic compound having at least one labile hydrogen atom and (B) an epoxy resin derived from epichlorohydrin and a polyhydroxy hydrocarbon, and (3) a metal hydroxide, said metal being selected from the group consisting of alkali and alkaline earth metals, said cement and said resin being employed in a weight ratio of cement to resin of about 1:1 to about 50:1.

4. The composition of claim 3 wherein said metal hydroxide is sodium hydroxide.

5. A composition suitable for producing cellular concrete comprising (1) hydraulic cement, (2) a resin selected from the group consisting of (A) a polyurethane resin derived from a polyisocyanate and an organic compound having at least one labile hydrogen atom and (B) an epoxy resin derived from epichlorohydrin and a polyhydroxy hydrocarbon, (3) a metallic hydroxide wherein said metal is selected from the group consisting of alkali and alkaline earth metals, and (4) a metallic expanding agent; said cement and said resin being employed in a weight ratio of cement to resin of about 1:1 to about 50:1.

6. The composition of claim 5 wherein said resin is an epoxy resin, said metal hydroxide is sodium hydroxide and said metallic expanding agent is aluminum.

7. The composition of claim 5 wherein said resin is a glycidyl polyether of 2,2-di(p-hydroxyphenyl)propane, said metallic hydroxide is sodium hydroxide and said expanding agent is aluminum.

8. A composition suitable for producing cellular concrete comprising (1) a hydraulic cement, (2) a resin selected from the group consisting of (A) a polyurethane resin derived from a polyisocyanate and an organic compound having at least one labile hydrogen atom and (B) an epoxy resin derived from epichlorohydrin and a polyhydroxy hydrocarbon, (3) an $\alpha$-metallo metallic salt of a carboxylic acid wherein the metallo and metallic elements are selected from the group consisting of alkali and alkaline earth metals, and (4) a metallic expanding agent; said cement and said resin being employed in a weight ratio of cement to resin of about 1:1 to about 50:1; said $\alpha$-metallo metallic salt being employed in a weight ratio of about 1:1 to about 5:1 of said salt to said expanding agent.

9. The composition of claim 8 wherein said resin is an epoxy resin, said $\alpha$-metallo metallic salt is $\alpha$-sodio-sodium acetate and said metallic expanding agent is aluminum.

10. The composition of claim 8 wherein said resin is a glycidyl ether of 2,2-di-(p-hydroxyphenyl)propane, said $\alpha$-metallo metallic salt is $\alpha$-sodio-sodium acetate and said expanding agent is aluminum.

11. Foamed cellular concrete obtained by admixing water with the ingredients of the composition of claim 5.

12. Foamed cellular concrete obtained by admixing water with the ingredients of the composition of claim 7.

13. Foamed cellular concrete obtained by admixing water with the ingredients of the composition of claim 10.

14. The process of producing foamed cellular concrete which comprises admixing water with the ingredients of the composition of claim 5.

15. The process of producing foamed cellular concrete which comprises admixing water with the ingredients of the composition of claim 7.

16. The process of producing foamed cellular concrete which comprises admixing water with the ingredients of the composition of claim 10.

17. The process of producing foamed cellular concrete which comprises admixing water with the ingredients of the composition of claim 11.

18. The process of producing foamed cellular concrete which comprises admixing water with the ingredients of the composition of claim 12.

19. A foamed concrete obtained by admixing water with hydraulic cement, an aluminum expanding agent, α-sodio-sodium acetate, a glycidyl polyether of 2,2-di-(p-hydroxyphenyl)propane having a molecular weight ranging from 300 to 530, and melamine formaldehyde resin; said cement and said polyether being employed in a weight ratio of 10:1 to 20:1, respectively, and said acetate being employed in a weight ratio of said acetate to said expanding agent of 1.5:1 to 2:1.

20. A foamed concrete obtained by admixing water with hydraulic cement, an aluminum expanding agent, α-sodio-sodium acetate, a glycidyl polyether of 2,2-di-(p-hydroxyphenyl)propane having a molecular weight ranging from 300 to 530, and dimethylaminomethyl phenol; said cement and said polyether being employed in a weight ratio of 10:1 to 20:1, respectively, and said acetate being employed in a weight ratio of said acetate to said expanding agent of 1.5:1 to 2:1.

21. A foamed concrete obtained by admixing water with hydraulic cement, an aluminum expanding agent, α-sodio-sodium acetate, a glycidyl polyether of 2,2-di-(p-hydroxyphenyl)propane having a molecular weight ranging from 300 to 530, and acrylamide; said cement and said polyether being employed in a weight ratio of 10:1 to 20:1, respectively, and said acetate being employed in a weight ratio of said acetate to said expanding agent of 1.5:1 to 2:1.

22. A foamed concrete obtained by admixing water with hydraulic cement, an aluminum expanding agent, α-sodio-sodium acetate, glycidyl polyether of 2,2-di-(p-hydroxyphenyl)propane having a molecular weight ranging from 300 to 530, and 2,4,6-tris-(dimethylaminomethyl)phenol; said cement and said polyether being employed in a weight ratio of 10:1 to 20:1, respectively, and said acetate being employed in a weight ratio of said acetate to said expanding agent of 1.5:1 to 2:1.

23. A foamed concrete obtained by admixing water with hydraulic cement, an aluminum expanding agent, α-sodio-sodium acetate, sodium hydroxide, a polymerized glycidyl polyether of 2,2-di-(p-hydroxyphenyl)propane having a molecular weight ranging from 300 to 530, and melamine formaldehyde resin; said cement and said polyether being employed in a weight ratio of 10:1 to 20:1, respectively, and said acetate being employed in a weight ratio of said acetate to said expanding agent of 1.5:1 to 2:1.

24. A foamed concrete obtained by admixing water with hydraulic cement, an aluminum expanding agent, α-sodio-sodium acetate, sodium hydroxide, a polymerized glycidyl polyether of 2,2-di-(p-hydroxyphenyl)propane having a molecular weight ranging from 300 to 530, and dimethylaminomethyl phenol; said cement and said polyether being employed in a weight ratio of 10:1 to 20:1, respectively, and said acetate being employed in a weight ratio of said acetate to said expanding agent of 1.5:1 to 2:1.

25. A foamed concrete obtained by admixing water with hydraulic cement, an aluminum expanding agent, α-sodio-sodium acetate, sodium hydroxide, a polymerized glycidyl polyether of 2,2-di-(p-hydroxyphenyl)propane having a molecular weight ranging from 300 to 530, and acrylimide; said cement and said polyether being employed in a weight ratio of 10:1 to 20:1, respectively, and said acetate being employed in a weight ratio of said acetate to said expanding agent of 1.5:1 to 2:1.

26. A foamed concrete obtained by admixing water with hydraulic cement, an aluminum expanding agent, α-sodio-sodium acetate, sodium hydroxide, a polymerized glycidyl polyether of 2,2-di-(p-hydroxyphenyl)propane having a molecular weight ranging from 300 to 530, and 2,4,6-tris-(dimethylaminomethyl)phenol; said cement and said polyether being employed in a weight ratio of 10:1 to 20:1, respectively, and said acetate being employed in a weight ratio of said acetate to said expanding agent of 1.5:1 to 2:1.

References Cited by the Examiner

UNITED STATES PATENTS

| | | | |
|---|---|---|---|
| 1,954,117 | 4/34 | Caldwell | 106—87 |
| 2,506,486 | 5/50 | Bender et al. | 260—33.2 |
| 2,850,528 | 9/58 | Closson | 260—541 |
| 2,941,455 | 6/60 | Nagin | 94—5 |

WILLIAM H. SHORT, *Primary Examiner.*

LEON J. BERCOVITZ, *Examiner.*